United States Patent [19]
Henken et al.

[11] Patent Number: 5,544,855
[45] Date of Patent: Aug. 13, 1996

[54] VALVE

[75] Inventors: Immanuel Henken, Laatzen; Horst Langner, Hanover, both of Germany

[73] Assignee: WABCO Vermogensverwaltungs GmbH, Hanover, Germany

[21] Appl. No.: 304,765

[22] Filed: Sep. 12, 1994

[30] Foreign Application Priority Data

Sep. 15, 1993 [DE] Germany .................. 43 31 417.1

[51] Int. Cl.⁶ .................................................. F16K 47/04
[52] U.S. Cl. ........................................ 251/121; 251/205
[58] Field of Search ............................ 251/120, 121, 251/205

[56] References Cited

U.S. PATENT DOCUMENTS

| | | | |
|---|---|---|---|
| 1,406,060 | 2/1922 | Mueller | 137/382 |
| 1,777,261 | 9/1930 | Grainger et al. | 251/121 |
| 1,862,812 | 6/1932 | Thompson | 251/205 X |
| 2,069,309 | 2/1937 | Henszey | 251/205 X |
| 2,516,825 | 7/1950 | Hejkuk et al. | 251/122 |
| 2,621,011 | 12/1952 | Smith | 251/121 |
| 2,899,980 | 8/1959 | Loebel et al. | 251/205 X |
| 3,010,695 | 11/1961 | Banks | 251/205 |
| 3,110,320 | 11/1963 | Rosenberger | 251/123 X |
| 3,198,479 | 8/1965 | Greenwood | 251/205 X |
| 3,305,207 | 2/1967 | Calderoni et al. | 251/205 X |
| 3,521,852 | 7/1970 | Gillis, Jr. | 251/121 |
| 3,557,833 | 1/1971 | Gilmont | 251/205 |
| 3,880,401 | 4/1975 | Wiltse | 251/205 |
| 5,156,188 | 10/1992 | Wakita et al. | 251/121 X |
| 5,163,476 | 11/1992 | Wessman | 251/121 X |

FOREIGN PATENT DOCUMENTS

| | | |
|---|---|---|
| 305710 | 11/1990 | European Pat. Off. . |
| 1062507 | 7/1959 | Germany . |
| 2046574 | 3/1972 | Germany . |
| 2602577 | 7/1977 | Germany . |
| 3219552 | 12/1983 | Germany . |
| 628594 | 9/1949 | United Kingdom . |

OTHER PUBLICATIONS

"Kavitationsströmung durch Regelventil–Drosselsysteme", A. Balint, Konstruktion 39, Springer–Verlag 1987, p. 467–473.

"Geräusche und Vibrationen an Reduzierventilen", Von E. Koppe, Mitteilungen Der VGB, Heft 44, Oct. 1956, p. 349–353.

Primary Examiner—John Rivell
Attorney, Agent, or Firm—Meltzer, Lippe, Goldstein et al.

[57] ABSTRACT

A valve which is formed by a face of a valve body and the outlet area of an opening in a counterpart is disclosed. An extension dipping into the opening to ensure smooth evolution of the beginning of opening operation is known. The opening behavior achieved in this manner is not sufficient for all applications. In order to further smooth the evolution of the beginning of the opening operation, a clearance fit is provided between the extension and the opening which is interrupted by a countersink in the extension or in the opening. The countersink is formed and placed in such a manner that it comprises the counterpart of the clearance fit and at least one inclined control edge and, thereby, an adjustable choke which can be controlled in series with the valve. The countersink can take the form of a groove. Valve arrangements for compressed-air systems in motor vehicles represent a special area of application for the invention.

1 Claim, 3 Drawing Sheets

VALVE

FIELD OF THE INVENTION

The instant invention relates to a valve formed by the face of a valve body and the outlet area of a opening in a counterpart. Valves of this type are called "seat valves" for short and are used for gaseous, as well as for liquid flowing, media.

BACKGROUND OF THE INVENTION

FIG. 1 schematically and by a solid line shows an embodiment of a prior art seat valve which has been used for a long time. Such a prior art valve (2, 4) is constituted by a face (6) of a preferably round valve body (2) and an outlet area (4) of an opening (5) in a counterpart (1). The valve (2, 4) is shown in a closed state. In the closed state, the face (6) presses sealingly on the outlet area (4). The valve (2, 4) is opened by an opening stroke s produced in a suitable and known manner on the valve body (2), as indicated by an arrow. The valve (2, 4) is closed by a closing stroke of the valve body in the opposite direction.

FIG. 6 shows the valve cross-section F, i.e., the passage cross-section of the valve (2, 4), in the form of a line a as a function of the opening stroke s. The valve cross-section F is a cylindrical surface proportional to the opening stroke s. Therefore, line a is a straight line. Considerable throughput of flow medium, even within the range of short opening strokes s, is allowed through the valve because the gradient of this straight line remains constant from the beginning of the opening of the valve (2, 4). Although generally desirable, such a characteristic is disadvantageous for some applications. For example, if the valve (2, 4) is to be used for a fine-tuned adjustment of the flow medium throughput and/or of the flow medium pressure, this characteristic is disadvantageous.

For this reason the valve (2, 4) has been further developed by providing an extension on the face (6) which dips into the opening (5). Such an extension (3) is indicated by a broken line in FIG. 1. The extension (3) is conical. This extension makes it possible to obtain a characteristic curve of the valve area F along line b in FIG. 6. All other conditions remain unchanged. This characteristic curve b has a considerably lower gradient within the range of short opening strokes s than does line a. A significant reduction of the original flow medium throughput is thereby produced. This reduction improves the performance of critical applications and makes it possible to use the valve (2, 4) in critical applications.

However, even the further development in form of an extension (3) on the face (6) of the valve (2, 4) is not sufficient to ensure satisfactory performance for all applications.

SUMMARY OF THE INVENTION

Therefore, it is an object of the instant invention to provide a valve wherein an additional reduction of the flow medium throughput with short opening strokes of the valve body, i.e., of the initial flow medium throughput, is ensured.

In one embodiment of the present invention, a valve having a valve body with a face and a counterpart with an opening which has an outlet area and an encircling edge is provided. An extension having a circumferential surface extends from the face and dips into the opening. A guiding area is formed on the circumferential surface. The guiding area goes through the encircling edge with a clearance fit. At least one countersink is formed on the extension facing away from the face and having a cross-section which widens as the distance from the face increases. At least one countersink is placed so that when the valve is closed, at least one part of the at least one countersink is located beyond the encircling edge and when the valve is opened, the at least one part at least partially passes the encircling edge.

In another embodiment of the invention, the countersink comprises at least two closing surfaces facing each other and inclined towards the face. The closing surfaces are formed on an end of the countersink away from said face.

In another embodiment of the present invention, a valve comprising a valve body having a face and a counterpart having an opening with an outlet area is provided. The opening has an enveloping surface. An extension having an encircling edge starts from the face and dips into the opening. A guiding area is formed on the enveloping surface and surrounds the encircling edge with a clearance fit. At least one countersink is formed on the opening. The one countersink extends towards the face and comprises a cross-section which widens as the distance to the face decreases. The countersink is placed so that when the valve is closed, at least part of the countersink is on a side of the encircling edge near the face and when said valve opens, that part of the countersink at least partially passes by the encircling edge.

In a particular application of the invention, the valve can be inserted into a braking system which has a solenoid-actuated valve system having high requirements for regulating quality. Such a braking system is described in EP-A-0 305 710.

BRIEF DESCRIPTION OF THE DRAWINGS

The invention is described below through the following drawings in which the same components with the same functions are given the same reference numbers throughout.

DETAILED DESCRIPTION OF THE INVENTION

Figure 1:
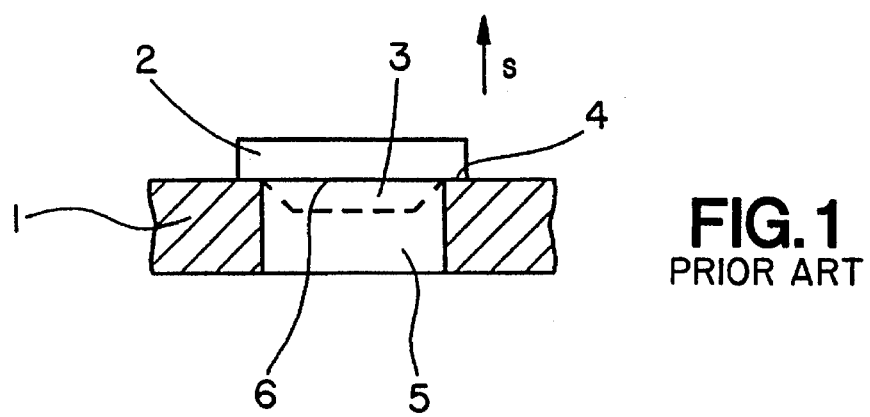
FIG. 1 illustrates a prior art valve.
Figure 2:
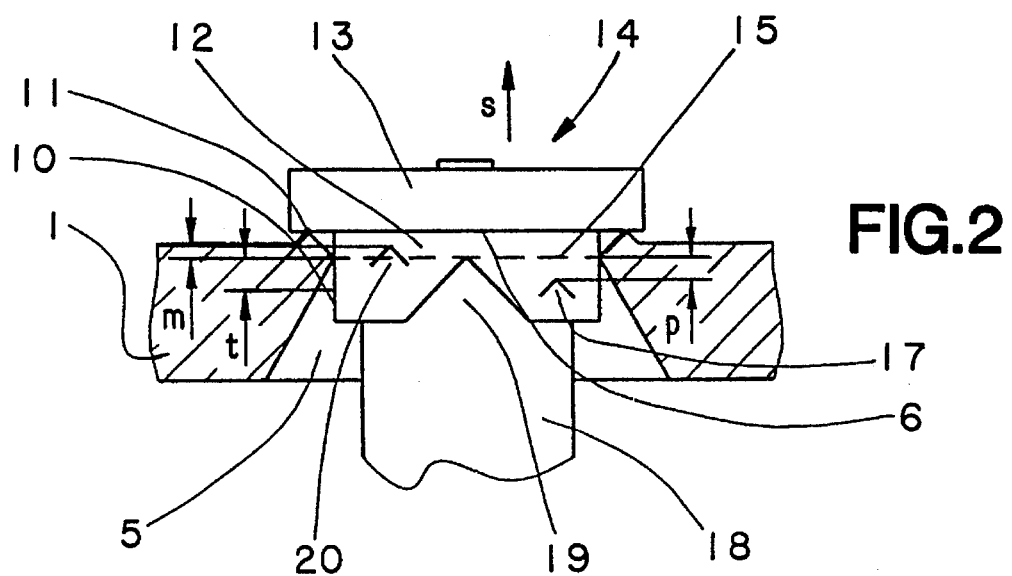
FIGS. 2 and 3 illustrate a first embodiment of a valve according to the present invention.

In FIG. 2, the face (6) on the valve head (13) is suitable to form the valve structure. The extension (12), which dips into the opening (5), starts at the face (6). The valve body (14) comprises the valve head (13), the extension (12) and a shaft (18). The last component need not be discussed in further detail in the present context. The valve body (14) can be used as the upper part of the adjusting element (42) in the solenoid-actuated valve of the previously mentioned EP-A-O 305 710.

In this embodiment, the outlet area is a raised valve seat (11) surrounding the outlet of the opening (5). The valve seat (11) together with the face (6) of the valve body (14) constitute the valve (11, 14). Valve seats of this type are often inserted in the outlet area of the opening. Additionally, valve seats can also be inserted on the face of the valve body or only on its face because they improve the tightness of the valve and create a defined sealing line or sealing surface. Such placement, defines the size of the valve surface. The valve seat and/or the counter-surface interacting with it are often made of an elastomer to further improve the tightness of the valve.

An encircling edge (15) parallel to the face (6) of the valve body (14) is formed on the inner surface of the opening (5). The edge (15) is indicated by a broken line because in the drawing it extends behind the extension (12).

A guiding area (10) is formed on the circumferential surface of the extension (12) and goes through the edge (15) of the opening (5) with a clearance fit. As seen from the face (6), the guiding area (10) extends from the edge (15) over a distance t. The distance t defines the range of smaller opening strokes s of the valve body (14) or the initial opening range of the valve (11, 14), as described below. Beyond the distance t, the circumferential surface of the extension (12) is smaller than the guiding area (10) and can be of any configuration. The extension (12) can also stop completely at distance t.

"Clearance fit" is understood to mean that the guiding area (10) of the extension (12) extends axially with a defined narrow radial clearance in the edge (15) of the opening (5). Such a clearance fit exists with a nominal diameter D of the guiding area (10) and of the edge (15) if, depending on the magnitude of the nominal diameter D, the diameter of the guiding area (10) is smaller by 0.01 D to 0.1 D and the diameter of the edge (15) is greater by 0.01 D to 0.1 D than the nominal diameter D.

In order to bring out the edge (15) during drawing, the opening (5) comprises two truncated cones set on top of each other. The penetration line of the cones constitutes the edge (15). In practical embodiments of the valve, the edge (15) will hardly be as clearly discernible. Rather, practical embodiments of the valve will be provided with guiding areas in the opening which are complementary to the guiding area (10) of the extension (12). In these valves, the edge (15) will, as a rule, be the physically barely discernible delimitation line of the guiding area in the opening on the outlet side.

A countersink in the form of a groove (19) is formed into the extension (12). The side view of the groove (19) is a triangle having an apex towards the face (6) and a base towards the end of the extension (12) away from the face (6). Therefore, the groove (19) exemplifies a countersink extending away from the face (6) having a cross-section that widens as the distance from the face (6) increases. The groove (19) must go at least as far as length t. In the illustrated embodiment, the groove extends as far as the end of the extension (12) away from the face (6) in order to simplify manufacture.

Figure 3:
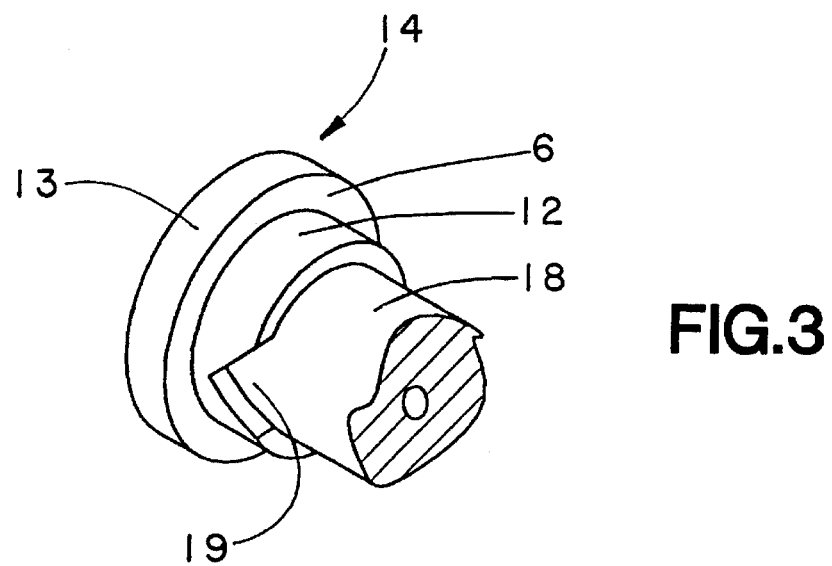

FIG. 3 shows the valve body (14) in a perspective view showing the groove (19) more clearly.

The groove (19) is placed so that when the valve (11, 14) is closed, its apex is just barely tangential to the encircling edge (15) of the opening (5).

In the explanation below of the operation of this embodiment, no ineffective or "empty" opening stroke of the valve body (14) is taken into consideration. Such an ineffective opening stroke may occur due to the disappearance of a deformation. Such deformations occur when the valve (11, 14) closes and may be particularly attributed to the elasticity of the valve seat (11) and/or the face (6).

The medium can flow through the exemplified embodiment with equal effect from the top, as well as from the bottom, as seen by the viewer.

The possible range of opening strokes of the valve body (14) is in principle divided into two sub-ranges. The first sub-range, i.e., the range of smaller opening strokes s or the initial opening range of the valve (11, 14), applies to opening strokes s between 0 and t inclusive. The second sub-range, i.e., the range of longer opening strokes s, follows the first sub-range as the opening stroke s lengthens.

In the first sub-range, i.e., in the range of shorter opening strokes s, the valve area F, which determines the flow medium throughput, comprises the cross-section of the ring slot, which is formed between the edge (15) of the opening (5) and the guiding area (10), as well as the available cross-section of the groove (19). The cross-section of the ring slot is undesirable but unavoidable because the clearance fit between the edge (15) and the guiding area (10) cannot be dispensed with for the sake of preserving the ease of movement of the valve body (14) in the opening (5). However, the clearance fit must be optimized so that this cross-section may be as small as possible. Such an optimized system is given in the embodiment having dimensions as described above.

Figure 6:
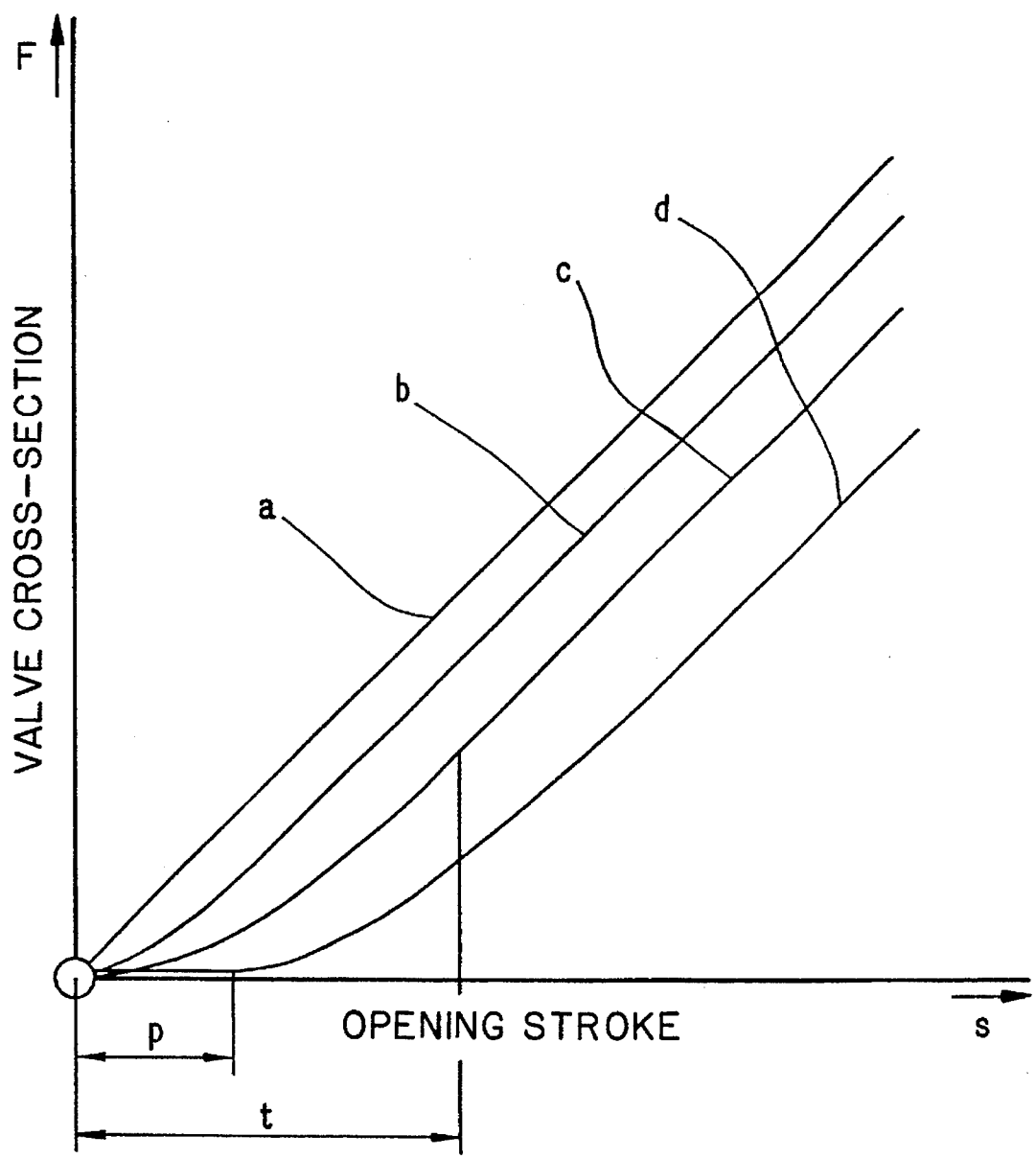
FIG. 6 shows characteristic valve lines.

A cross-section of the groove (19) is available in the above sense, if the apex of the groove (19) has gone beyond the edge (15) in the direction of the valve seat (11). In the placement of the apex tangential to the edge (15), a cross-section of the groove is available some a value 0 of the opening stroke s. This cross-section is at first very small. The widening of this cross-section as opening stroke s lengthens is still small due to an appropriate selection of the apex angle of the groove (19) and/or of the evolution of its radial depth. Therefore, with the exemplified embodiment, it is possible to obtain small valve cross-sections for opening strokes s between 0 and t. The line c in FIG. 6 schematically shows, in the range 0<s≦t, the clear reduction of the valve area F that is possible with small opening strokes s in the exemplified embodiment, while all other conditions with respect to lines a and b of the state of the art remain unchanged.

In the second sub-range, i.e., in the range of longer opening strokes s, the above-described determination of the valve area F by the guiding area (10), the edge (15) and the groove (19) no longer applies, or no longer applies to any great extent. The evolution of line c in this range depends on the dimension of the extension (12) beyond distance t. For the exemplified embodiment, dimensions are assumed to be such that the evolution of line c in the second sub-range continuously follows the evolution of line c in the first sub-range. However, discontinuous or irregular and sudden transitions between the two sub-ranges are also possible.

It is also possible to set the distance t so that it covers the entire possible range of the opening stroke s. In that case, a second sub-range does not appear. The possible range of the opening strokes s is often determined by a stop for the valve body (14).

The position of the apex of the groove (19) in relation to the edge (15) when the valve (11, 14) is closed makes it possible to vary the evolution of the valve area F, particularly at the beginning of the opening operation.

Reference number (20) identifies an arrangement of the groove (19) in which the apex of the groove (19) goes beyond the edge (15) by a dimension m in the direction of the face (6) when the valve (11, 14) is closed. Through this arrangement a nearing of line c to line b, i.e., a shifting of the evolution of the valve area F towards higher values, is obtained in FIG. 6.

Reference number (17) identifies an arrangement of the groove (19) in which the apex of the groove (19) is beyond the edge (15) by a distance p, as seen from the face (6), when the valve (11, 14) is closed. This arrangement advantageously uses the existence of the ring slot between edge (15) and guiding area (10), which was previously indicated as disadvantageous. In this arrangement, up to an opening stroke s=p, only the cross-section of the ring slot is available as the valve area F. The groove (19) makes an additional cross-section available only for opening strokes s from p up to and including t. With this arrangement (17), a particularly slow opening of the valve (11, 14), a so-called "creeping" opening, can be achieved, as indicated by line d in FIG. 6. Line d in FIG. 6 represents the (constant) cross-section of the ring slot as a valve area F in the range 0<s≦p. The evolution of the valve area F can also be varied by the evolution of the cross-section of the groove (19), e.g., by a convex or concave curvature of the groove flanks and/or through progressive or regressive evolution of the groove depth in a direction perpendicular to the opening stroke s.

Figure 4:
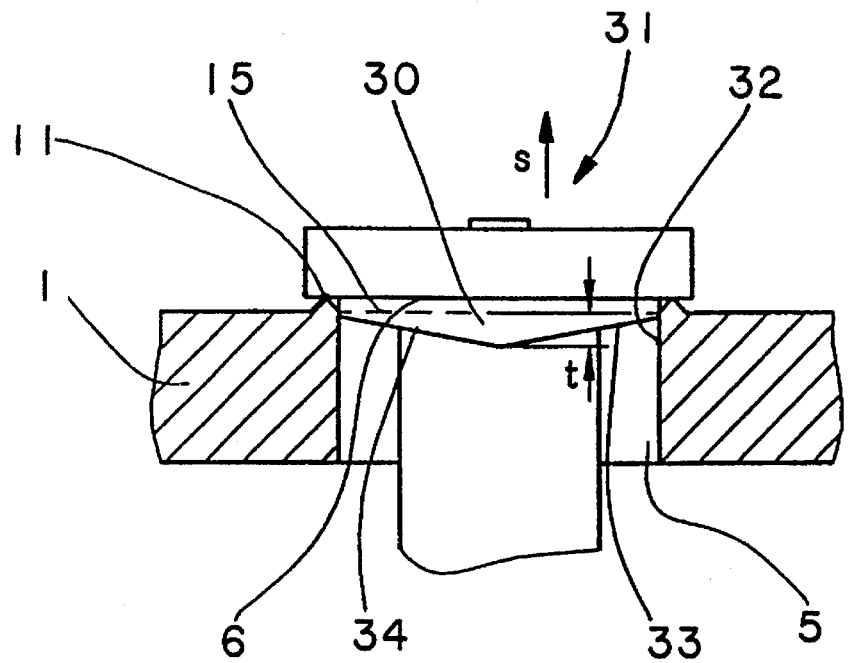
FIGS. 4 and 5 illustrate a second embodiment of a valve according to the invention.

FIG. 4 illustrates an embodiment in which the countersink of the extension (30) is constituted by two end surfaces (33, 34) facing each other, which are inclined towards the face (6) and formed on the end of the extension (30) away from the face (6). As illustrated, the end surfaces (33, 34) extend in the shape of a pointed roof. The distance t of the guiding area of the extension (30), which is not designated otherwise in this embodiment, is shown as a crest height or an apex height of the pointed roof over the edge (15) and going around in the opening (5).

The inner surface of the opening (5) contains a guiding area which is complementary to the guiding area on extension (30). The length of the guiding area is at least equal to distance t.

The encircling edge (15) of the opening (5) is the transition edge from the guiding area of the opening and a truncated cone extending toward the valve seat (11). The apex of the groove (19) of the former embodiment (FIGS. 2 and 3) corresponds in this embodiment to the points of end surfaces (33, 34) which are closest to the face (6) on the left and right side of the drawing.

Figure 5:
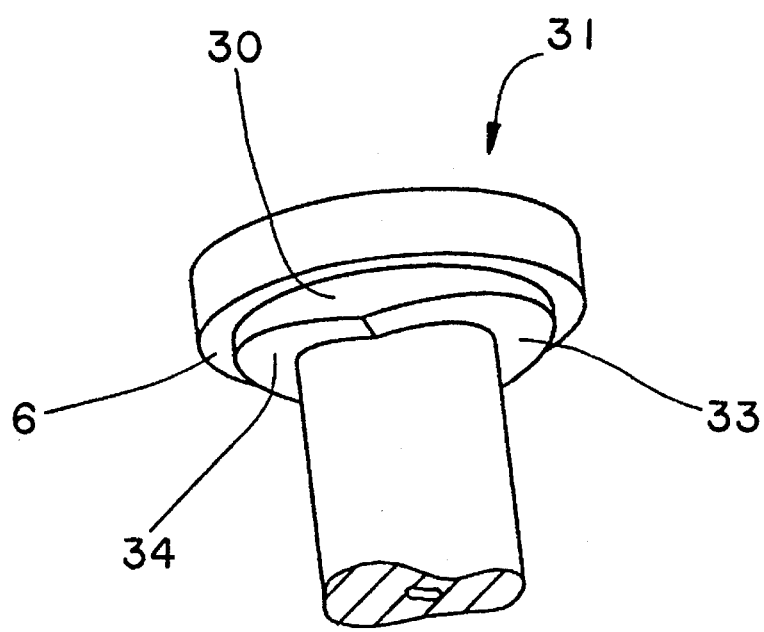

FIG. 5 shows a perspective view of the valve body (31) which shows the end surfaces (33, 34) more clearly.

When the points of the end surfaces (33, 34) which are closest to the face (6) have passed the encircling edge (15) as the valve, here designated by (11, 31), opens, the cross-sections of the end surfaces (33) and (34) have in principle the same evolution in combination with the edge (15) as the opening stroke s lengthens as the groove (19) of the previous exemplified embodiment. Therefore, depending on whether a characteristic line according to line c or according to line d in FIG. 6 is desired for the embodiment of FIG. 4, the points of the end surfaces 33 and 34 which are closest to the face (6) when the valve (11, 31) is closed may be located on or beyond the encircling edge (15), as seen from the face (6). Similar to the previous embodiment, the evolution of the valve cross-section can also be varied by convex or concave curvatures of the end surfaces (33, 34).

The valve body with the inclined end surfaces (33, 34) of the extension (30) can be produced at relatively low cost. Therefore, the embodiment according to FIGS. 4 and 5 represent an economic solution.

Barring anything to the contrary as stated above, what is said for one embodiment applies directly or in corresponding application to the other embodiment.

In addition to the shown designs, the countersink in the extension may be made in any appropriate manner. One such manner is having grooves which evolve in the shape of a screw or in the longitudinal direction of the valve body, with flanks that need not converge at an angle as in a triangle, but may run parallel. In such a case, the required widening of the cross-section of the countersink must be ensured by the evolution of the groove depth in a direction perpendicular to the opening stroke. This type of countersink can be made with low-cost manufacturing. The countersink may also be constituted by several grooves. In one case where the countersink is made in the form of surfaces, as shown in FIGS. 4 and 5, the countersink may also be constituted by one surface or more than two surfaces.

Basically, it is advantageous for the countersink to be provided in such number and to be distributed over the extension in such a manner, that the flow through the valve does not cause any transversal forces upon the valve body. Transversal forces may cause a contact between the valve body and the opening, and thereby impair the ease of operation of the valve body. Therefore transversal forces have a disadvantageous influence on the response behavior of the valve.

The invention can be implemented in an opposite form not shown here, by locating the surrounding edge on the extension of the valve body and the guiding area, as well as the countersink, on or in the enveloping surface of the opening. In this case, the guiding area surrounds the circular edge with a clearance fit. Furthermore, the countersink must extend closer to the face of the valve body and its cross-section must widen as the distance from the face decreases. The countersink must be placed in such a manner that when the valve is closed and seen from the face it is at least in part on this side of the surrounding edge. Therefore, this part is at least partially passed by the edge when the valve is opened. All descriptions regarding the drawn embodiments apply for this embodiment which is not shown in a drawing.

In conclusion it should be pointed out that the protection of the instant invention is not limited to the embodiments of the examples and to the mentioned possibilities for further development but covers all embodiments whose characteristics are covered by the following claims.

We claim:

1. A valve, comprising:

a valve body having a face, a counterpart having an opening with an outlet area and an encircling edge, an extension having a circumferential surface, wherein said extension extends from said face into said counterpart opening, a guiding area formed on said circumferential surface, said guiding area passing through said encircling edge with a clearance fit, a countersink formed on said extension facing away from said face, said countersink having a cross-section which widens as the distance from said face increases, wherein said countersink is positioned so that, when said valve is closed, at least one part of said countersink extends beyond said encircling edge, and when said valve is opened, said at least one part at least partially passes said encircling edge, and said countersink comprising at least two end surfaces inclined towards said face, said end surfaces being formed on an end of said countersink away from said face, said end surfaces intersecting each other, their region of intersection being said end surfaces' remotest portion from said face.

* * * * *